United States Patent
Biskeborn et al.

(10) Patent No.: US 7,933,089 B2
(45) Date of Patent: Apr. 26, 2011

(54) TRACK-ADAPTED DATA CLOCKING

(75) Inventors: Robert Glenn Biskeborn, Hollister, CA (US); Larry LeeRoy Tretter, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 255 days.

(21) Appl. No.: 12/240,213

(22) Filed: Sep. 29, 2008

(65) Prior Publication Data
US 2010/0079891 A1    Apr. 1, 2010

(51) Int. Cl.
*G11B 5/09* (2006.01)
(52) U.S. Cl. .......................... 360/51; 360/48
(58) Field of Classification Search ............ None
See application file for complete search history.

(56) References Cited

U.S. PATENT DOCUMENTS

| | | | |
|---|---|---|---|
| 3,947,972 A | 4/1976 | Freeman | 360/121 |
| 5,181,150 A | 1/1993 | Hayakawa et al. | 360/121 |
| 5,436,780 A | 7/1995 | Nagata et al. | 360/121 |
| 5,488,525 A | 1/1996 | Adams et al. | 360/77.12 |
| 5,771,142 A | 6/1998 | Maurice et al. | 360/121 |
| 5,953,184 A | 9/1999 | Barber et al. | 360/121 |
| 5,959,812 A | 9/1999 | Rothermel | 360/118 |
| 5,963,400 A * | 10/1999 | Cates et al. | 360/317 |
| 6,040,963 A | 3/2000 | Rothermel | 360/118 |
| 6,477,003 B1 | 11/2002 | Kalfs et al. | 360/121 |
| 7,154,691 B2 | 12/2006 | Girvin et al. | 360/121 |
| 7,170,709 B2 | 1/2007 | Okafuji et al. | 360/77.12 |
| 7,193,812 B2 | 3/2007 | Eaton | 360/77.12 |
| 7,253,988 B2 | 8/2007 | Okafuji et al. | 360/77.12 |
| 7,382,569 B2 | 6/2008 | Biskeborn et al. | 360/77.12 |
| 2007/0047142 A1 | 3/2007 | Biskeborn et al. | 360/129 |
| 2007/0097541 A1 | 5/2007 | Okafuji et al. | 360/77.12 |
| 2008/0151415 A1 | 6/2008 | Biskeborn et al. | 360/77.12 |
| 2009/0021855 A1 * | 1/2009 | Fasen | 360/71 |

FOREIGN PATENT DOCUMENTS

JP    58177518 A    10/1983

OTHER PUBLICATIONS

Office Action Summary from U.S. Appl. No. 11/548,663 mailed on Oct. 16, 2007.
Office Action Summary from U.S. Appl. No. 12/042,733 mailed on Jul. 11, 2008.
Office Action Summary from U.S. Appl. No. 12/042,733 mailed on Sep. 16, 2008.
Notice of Allowance from U.S. Appl. No. 11/548,663 mailed on Feb. 22, 2008.

* cited by examiner

*Primary Examiner* — Jason C Olson
(74) *Attorney, Agent, or Firm* — Zilka-Kotab, PC

(57) ABSTRACT

A method for writing data to a tape at multiple rates for simultaneously creating data tracks having differing linear data densities, according to one embodiment, includes passing a tape over a head, the head having an array of writers thereon; receiving incoming data; mapping the data to a two dimensional array corresponding to the array of writers; clocking some of the mapped data to a first writer in the array of writers at a first rate; and clocking some of the mapped data to a second writer in the array of writers at a second rate different than the first rate.

20 Claims, 13 Drawing Sheets

TRACK-ADAPTED DATA CLOCKING

BACKGROUND

The present invention relates to data storage systems, and more particularly, this invention relates to track-adapted data clocking.

Business, science and entertainment applications depend upon computing systems to process and record data. In these applications, large volumes of data are often stored or transferred to nonvolatile storage media, such as magnetic discs, magnetic tape cartridges, optical disk cartridges, floppy diskettes, or floptical diskettes. Typically, magnetic tape is the most economical, convenient, and secure means of storing or archiving data.

Storage technology is continually pushed to increase storage capacity and storage reliability. Improvement in data storage densities in magnetic storage media, for example, has resulted from improved medium materials, improved error correction techniques and decreased areal bit sizes. The data capacity of half-inch magnetic tape, for example, is currently measured in hundreds of gigabytes.

The improvement in magnetic medium data storage capacity arises in large part from improvements in the magnetic head assembly used for reading and writing data on the magnetic storage medium. A major improvement in transducer technology arrived with the magnetoresistive (MR) sensor originally developed by the IBM® Corporation. Later sensors using the GMR effect were developed. AMR and GMR sensors transduce magnetic field changes to resistance changes, which are processed to provide digital signals. AMR and GMR sensors offer signal levels higher than those available from conventional inductive read heads for a given read sensor width and so enable smaller reader widths and thus More tracks per inch, and thus higher data storage density. Moreover, the sensor output signal depends only on the instantaneous magnetic field intensity in the storage medium and is independent of the magnetic field time-rate-of-change arising from relative sensor/medium velocity. In operation the magnetic storage medium, such as tape or a magnetic disk surface, is passed over the magnetic read/write (R/W) head assembly for reading data therefrom and writing data thereto.

The quantity of data stored on a magnetic tape may be increased by increasing the number of data tracks across the tape. More tracks are made possible by reducing feature sizes of the readers and writers, such as by using thin-film fabrication techniques and MR sensors. However, the feature sizes of readers and writers cannot be arbitrarily reduced. Factors such as lateral tape motion transients and tape lateral expansion and contraction must be balanced with reader/writer sizes that provide acceptable written tracks and readback signals. One particular problem limiting areal density is misregistration caused by tape lateral expansion and contraction. Tape width can vary by up to about 0.1% due to expansion and contraction caused by changes in humidity, tape tension, temperature, etc.

Thus, while the reader/writer array width does not change, the spacing of the data tracks on the tape will vary as the tape expands and contracts. Ideally, the reader track width would be as wide as the data track being read; this would provide the best signal. However, sensor track widths cannot be made as wide as the data tracks, because the sensors would read adjacent tracks upon expansion or contraction of the tape and/or due to lateral misregistration between tape and head. Accordingly, reader widths are currently designed to be substantially smaller than the data track width, and all readers in a given head having the same track width. The reader track width is selected to accommodate the worst case scenarios, i.e., the designer takes into account maximum expansion/contraction and lateral misregistration when determining reader track width so that each sensor is over a given track at any time.

FIGS. 1 and 2A-2B represent the effect of tape lateral expansion and contraction on reader position relative thereto. FIG. 1 shows the head 100 relative to the tape 102, where the tape has a nominal width. As shown, the readers 104 are aligned with the data tracks 106 on the tape 102. FIG. 2A shows the effect of tape lateral contraction. As shown, the outermost readers 108 are positioned along the outer edges of the outer data tracks. FIG. 2B shows the effect of tape lateral expansion. As shown, the outermost readers 108 are positioned along the inner edges of the outer data tracks. Because all of the readers 104 have the same width, the readback signal level from each reader will normally be the same.

In any kind of magnetic recording, error detection and correction has great practical importance in maintaining data (information) integrity across noisy channels and potentially unreliable storage media. An error-correcting code (ECC) or forward error correction (FEC) code is a code in which each data signal conforms to specific rules of construction so that departures from this construction in the received signal can generally be automatically detected and corrected. It is used in computer data storage, for example in magnetic recording, dynamic RAM, and in data transmission.

ECC processing is currently applied to all tracks equally. However, such uniform partitioning is inefficient both in terms of the amount of media space to store the code as well as power to drive the ECC processing.

Moreover, there is also a need to increase data storage capacity for a given area of media.

SUMMARY

A method for writing data to a tape at multiple rates for simultaneously creating data tracks having differing linear data densities, according, to one embodiment, includes passing a tape over a head, the head having an array of writers thereon; receiving incoming data; mapping the data to a two dimensional array corresponding to the array of writers; clocking some of the mapped data to a first writer in the array of writers at a first rate; and clocking some of the mapped data to a second writer in the array of writers at a second rate different than the first rate.

A method for reading data from data tracks having differing linear data densities, according to another embodiment, includes passing a tape over a head, the head having an array of readers thereon; receiving signals from the readers; processing the signal from a first reader in the array of readers at a first rate; and processing the signal from a second reader in the array of readers at a second rate different than the first rate.

A computer program product for writing data to a tape at multiple rates for simultaneously creating data tracks having differing linear data densities, according to one embodiment, comprises a computer usable medium having computer usable program code embodied therewith. The computer usable program code includes computer usable program code configured to map incoming data to a two dimensional array corresponding to an array of writers, clock some of the mapped data to a first writer in the array of writers at a first rate, and clock some of the mapped data to a second writer in the array of writers at a second rate different than the first rate.

A computer program product for reading data from data tracks having differing linear data densities, according to another embodiment, includes a computer usable medium having computer usable program code embodied therewith.

The computer usable program code includes computer usable program code configured to process a signal from a first reader in an array of readers at a first rate, and process a signal from a second reader in the array of readers at a second rate different than the first rate.

Any of these embodiments may be implemented in a magnetic data storage system such as a tape drive system, which may include a magnetic head as recited above, a drive mechanism for passing magnetic medium (e.g., recording tape) over the magnetic head, and a controller (processor) electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

Figure 1:
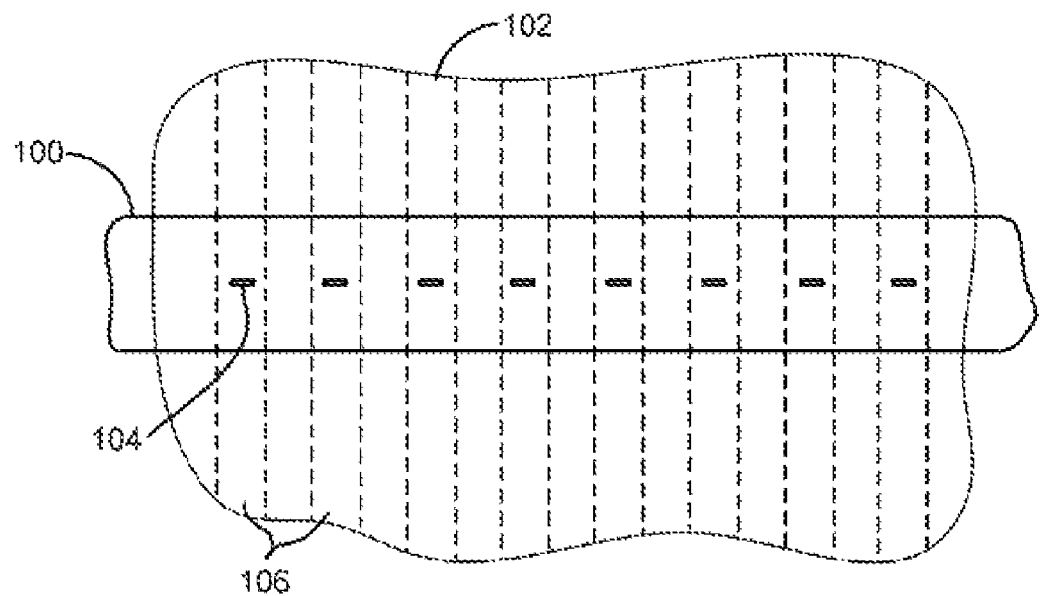
FIGS. 1 and 2A-2B illustrate the effect of tape lateral expansion and contraction on a traditional magnetic tape head.
Figure 2A:
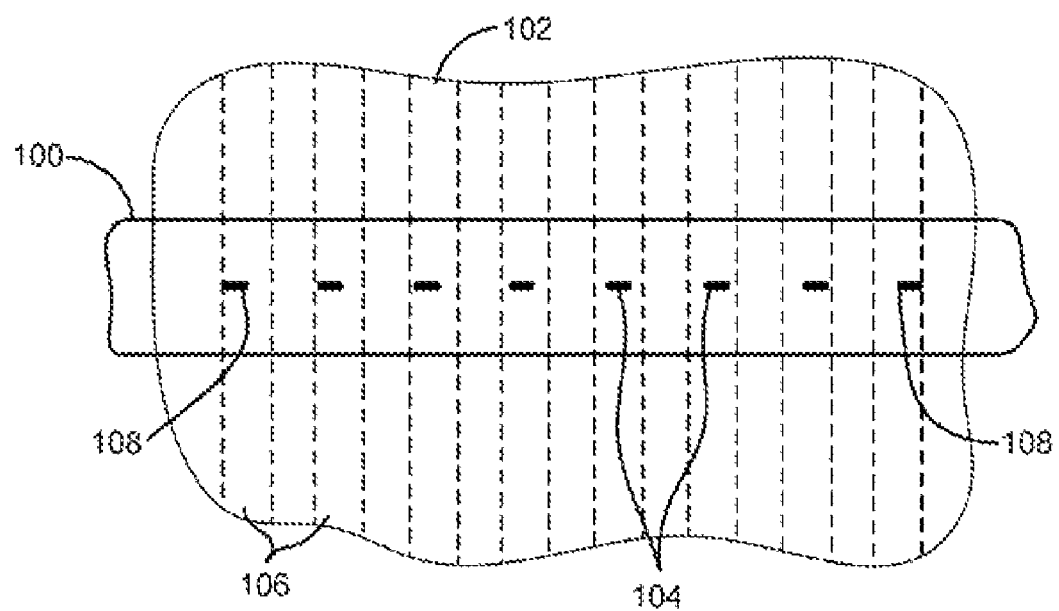
Figure 2B:
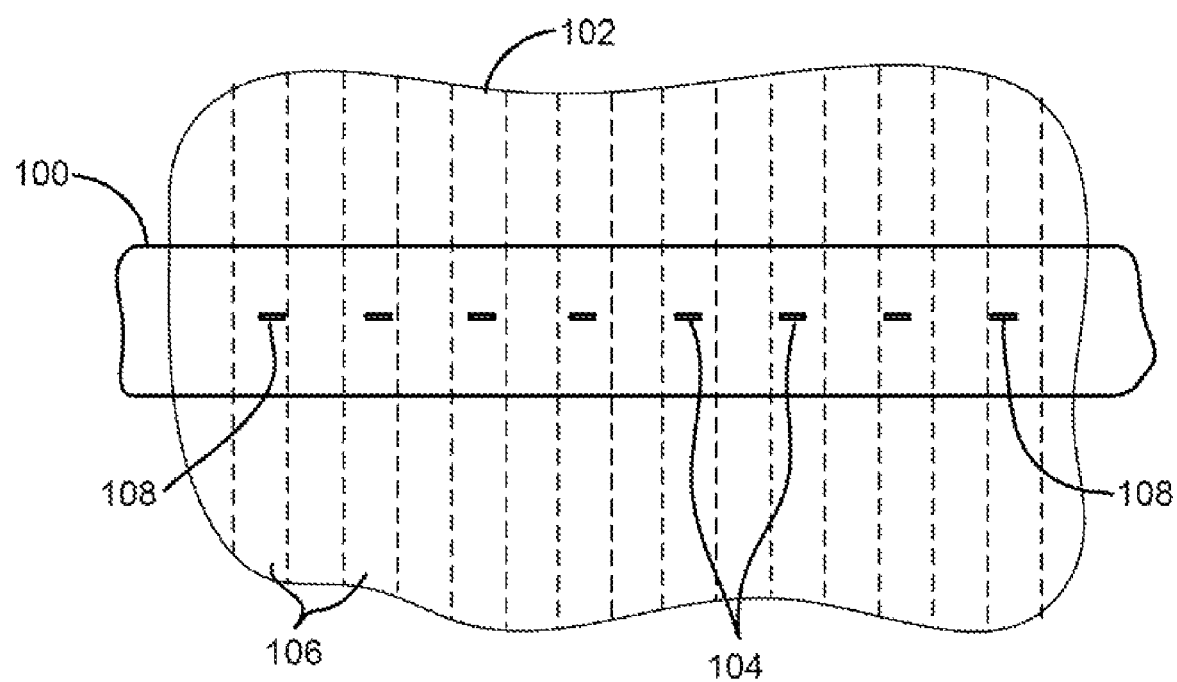

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

In the drawings, like and equivalent elements are numbered the same throughout the various figures.

Some embodiments provide improved error control functionality.

In one general embodiment, a method includes receiving signals from multiple readers; and performing more error control processing on a signal from an outer reader than on a signal from an inner reader.

In another general embodiment, a method includes receiving signals from multiple readers; and performing different amounts of error control processing on signals from at least two of the readers.

In another general embodiment, a tape-based data storage system includes a tape head having an array of readers; and a processor coupled to the head for performing error control processing, wherein the processor performs more error control processing on a signal from the outer reader than on a signal from the inner reader.

Various embodiments of the present invention enable reading and/or writing data tracks of differing linear density. For instance, during reading of data tracks where inner tracks have a higher linear density than outer tracks, a clock used to recover data from the inner reader has a shorter period than a clock used to recover data from the outer reader.

A method for writing data to a tape at multiple rates for simultaneously creating data tracks having differing linear data densities includes passing a tape over a head, the head having an array of writers thereon; receiving incoming data; mapping the data to a two dimensional array corresponding to the array of writers; clocking some of the mapped data to a first writer in the array of writers at a first rate; and clocking some of the mapped data to a second writer in the array of writers at a second rate different than the first rate.

A method for reading data from data tracks having differing linear data densities includes passing a tape over a head, the head having an array of readers thereon, receiving signals from the readers, processing the signal from a first reader in the array of readers at a first rate, and processing the signal from a second reader in the array of readers at a second rate different than the first rate.

Figure 3:
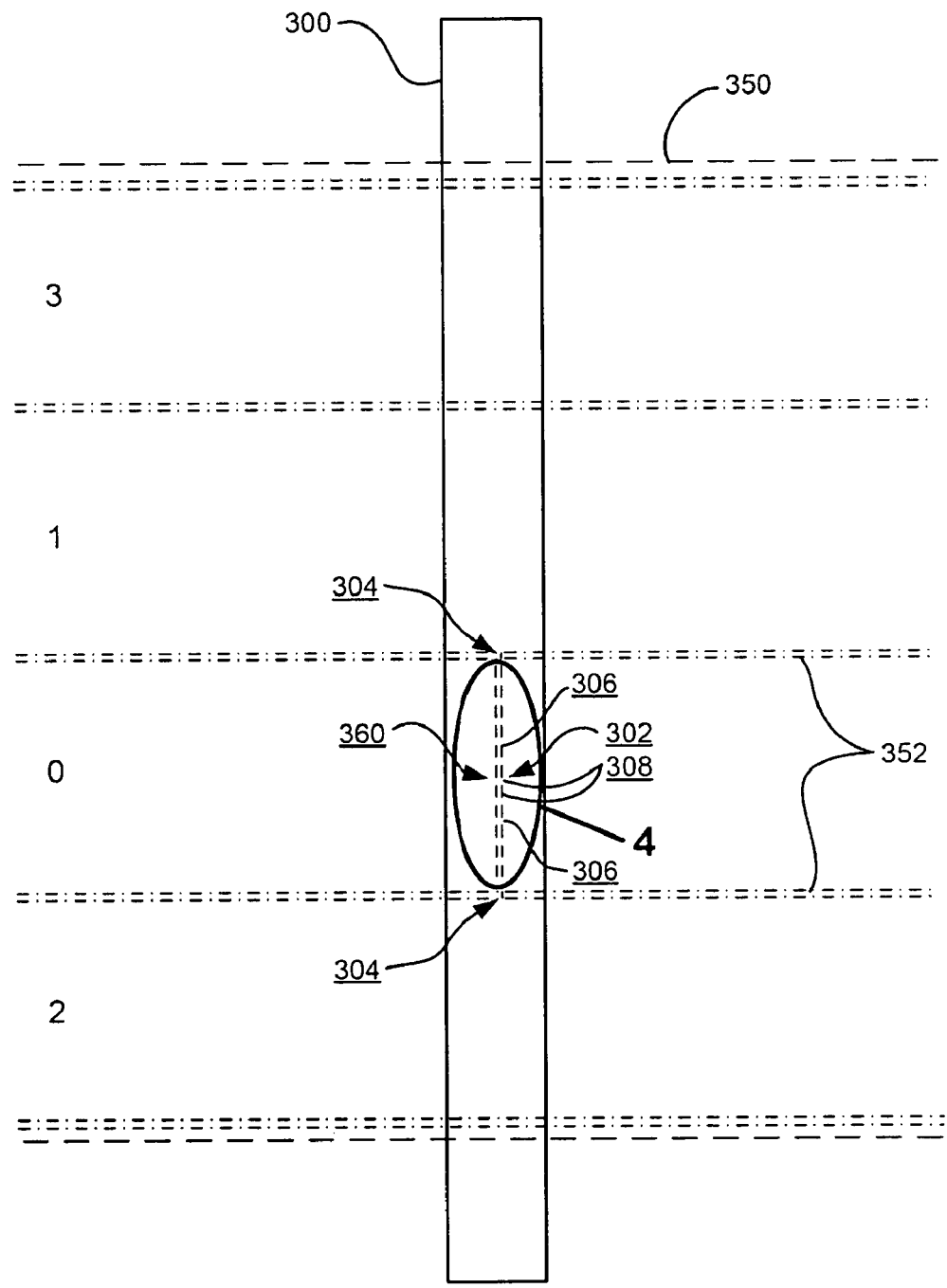
FIG. 3 is a tape bearing surface view of a magnetic tape head according to one embodiment of the present invention.
Figure 4:
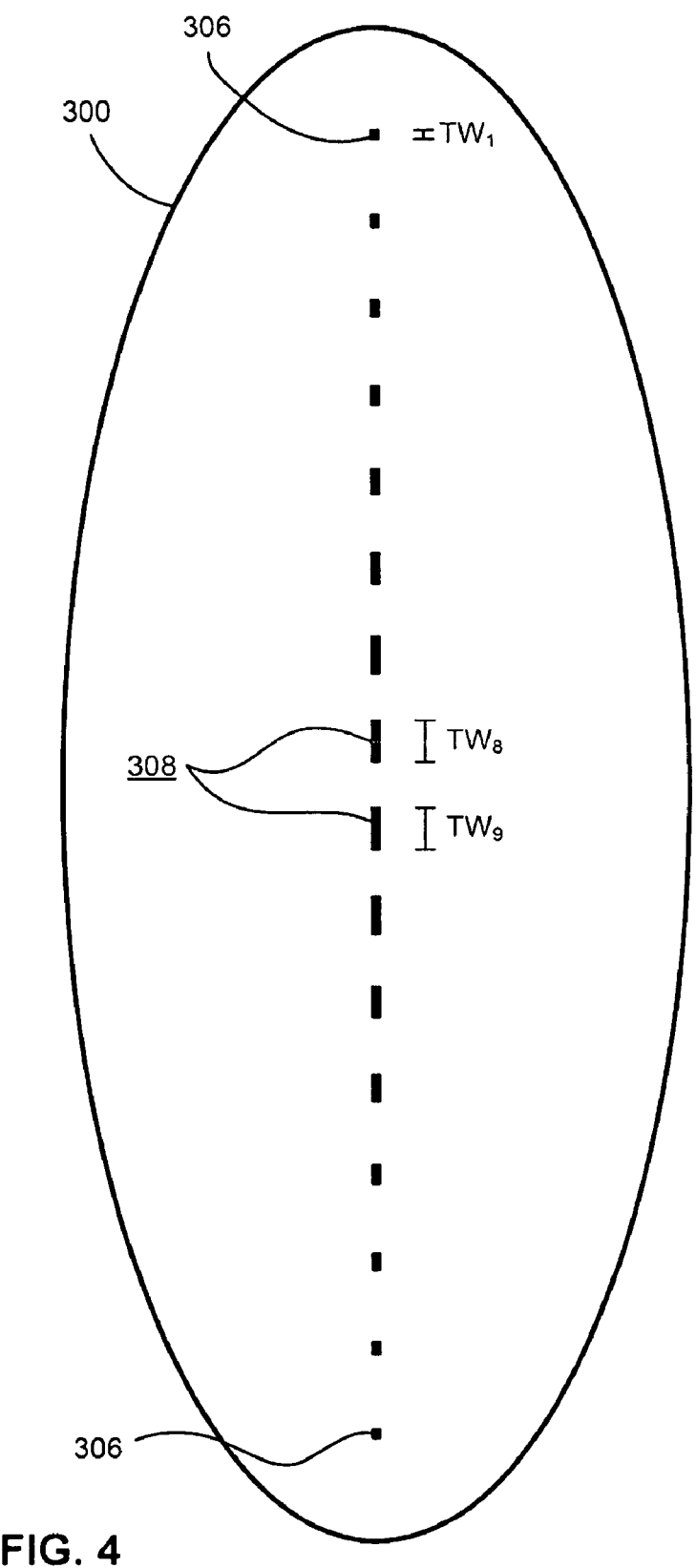
FIG. 4 is a detailed view taken from Circle 4 of FIG. 3 showing the array of readers according to one embodiment of the present invention.

FIGS. 3 and 4 together illustrate a magnetic tape head 300 according to one embodiment of the present invention, where the track widths TW of the readers 302 are scaled according to position in the reader array. For illustration, a tape 350 is shown in dashed lines. The tape has data bands 0, 1, 2, 3. Servo data 352 is factory-written on the tape 350. In Linear Tape Open (LTO), five servo patterns are written, thereby defining the four data bands 0, 1, 2, 3. Each of the data bands has a plurality of data tracks therein, such as 64 tracks, 128 tracks, etc. Each data band is currently 2.9 mm wide in LTO, but may be any width. Similarly, the servo tracks are approximately 0.19 mm wide, but may be larger or smaller. The illustrative head 300 shown has 16 readers 302, but may have more (e.g., 24, 32, 40) or less. Each reader will typically include a sensor and shields that surround the sensor. The sensors may be any type of sensor, including but not limited to Giant Magnetoresistive (GMR) sensors, Anisotropic Magnetoresistive (AMR) sensors, Magnetic Tunnel Junction (MTJ) sensors, etc.

In operation, the servo readers 304 read servo tracks 352 on the tape 350. A controller, which may or may not execute computer usable program code retrieved from a computer usable medium such as memory or a data storage device, analyzes the servo readback signal and positions the head 300 at the appropriate position relative to the tape 350 so that the readers 302 or writers 360 are over the appropriate data tracks on the tape 350. If the tape 350 expands, the outermost readers 306 may be adjacent the inside edges of the data tracks, yet the innermost readers 308 are aligned with about the center of the middle data tracks. The servo controller can determine how to center the innermost readers 308 on the middle data tracks: Particularly, servo readers 304 have a very small track width compared to servo tracks, and the controller can determine the lateral position of the head 300 relative to the tape 350 based on the servo readback signal.

The innermost readers 308 may thus be very close to centrally-aligned with the inner data tracks, as tape lateral expansion and contraction will have an increasingly greater effect on the position of the data tracks relative to the outermost readers/writers. Towards the middle of the data band, tape lateral expansion should have very little effect on track/reader misregistration. Accordingly, the readers 302 can be made wider towards the middle of the array, thereby providing an improved signal having greater signal to media noise ratio.

With continued reference to FIGS. 3 and 4, inner readers, preferably including at least the innermost readers 308, have a wider track width than at least some of the outer readers, i.e., those positioned between the inner readers and the ends of the array, and including the outermost readers 306, which neighbor servo readers 304 in this embodiment (see FIG. 3). For example, the track width of the outermost readers 306 may be set at what it would be in a conventionally designed head, e.g., about 0.25 to about 0.6 times the track pitch on the tape. The track widths of the remaining readers 302 progressively decrease from the innermost readers 308 to the outermost readers 306. The pitch (center to center spacing) between the readers 302 is preferably uniform across the reader array.

The progressively narrowing width of the readers reduces misregistration due to mistracking and tape width changes. Tape lateral expansion on some tapes is approximately 1200 ppm. Thus, for present 16-channel LTO heads, in which the outermost tracks are 2.5 mm apart, the tape expansion effect can be as much as 3.0 microns at the outermost readers 306, or 1.5 microns per track. This means that the innermost readers 308 can be wider by approximately this amount, since these readers 308 can be precisely positioned over the central data tracks in a given tape wrap, where all 16 heads simultaneously write tracks down the tape. A wider reader provides a lower noise signal. Particularly, making track widths of the innermost readers 308 wider can boost SMNR (signal-to-media noise ratio) by an amount proportional to the square root of the reader width for the central tracks in future products where the written track pitch will approach 2-3 microns. A preferred embodiment has reader track widths scaled linearly from widest at the innermost readers 308 to narrowest at the outmost reader 306.

Figure 5:
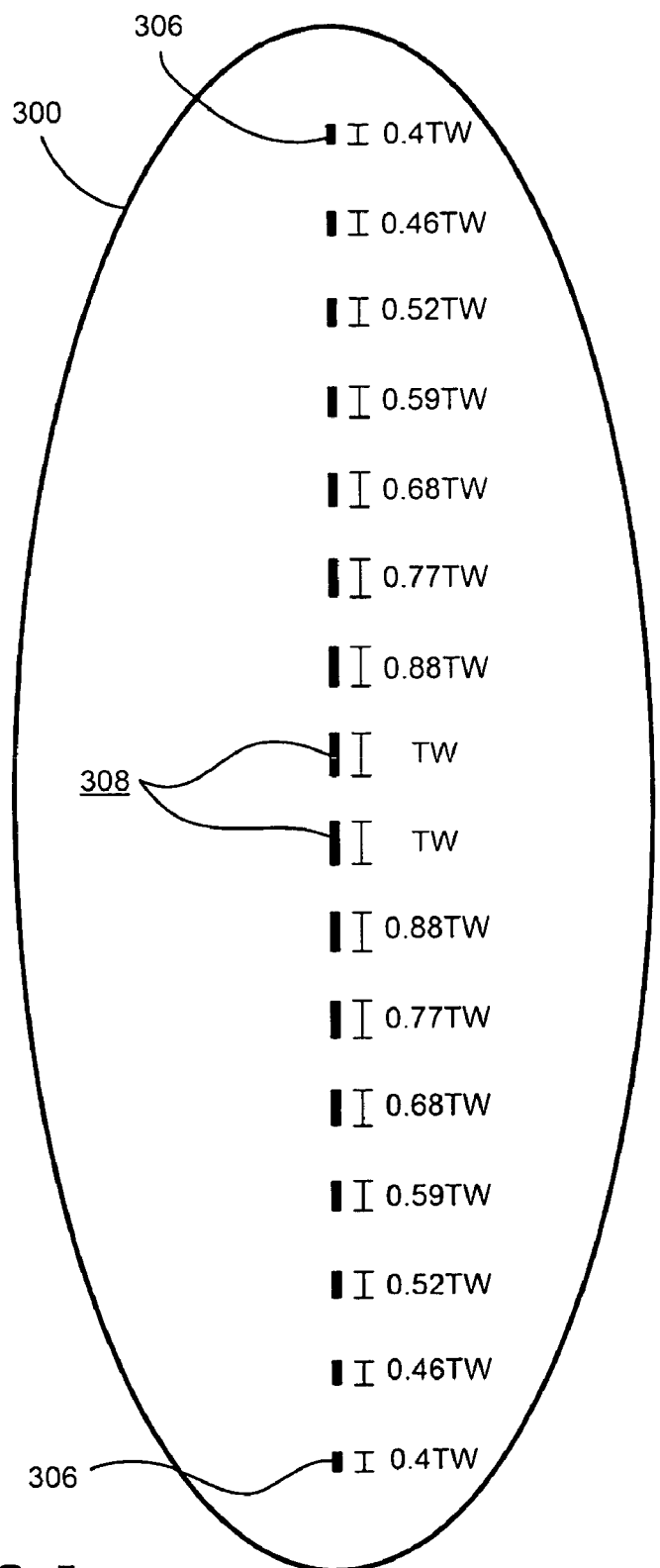
FIG. 5 is a tape bearing surface view of a magnetic tape head having an array of readers according to another embodiment of the present invention.

An alternate embodiment of the present invention has reader track widths scaled non-linearly from widest at the innermost readers 308 to narrowest at the outmost readers 306. FIG. 5 illustrates a head 300 where the reader track widths decrease progressively more pronouncedly from the innermost readers 308 to the outmost readers 306. In the embodiment shown, each reader width is smaller than its inner neighbor by about 14%. In this example, the progression towards narrower readers is more rapid and thus more conservative.

Figure 6:
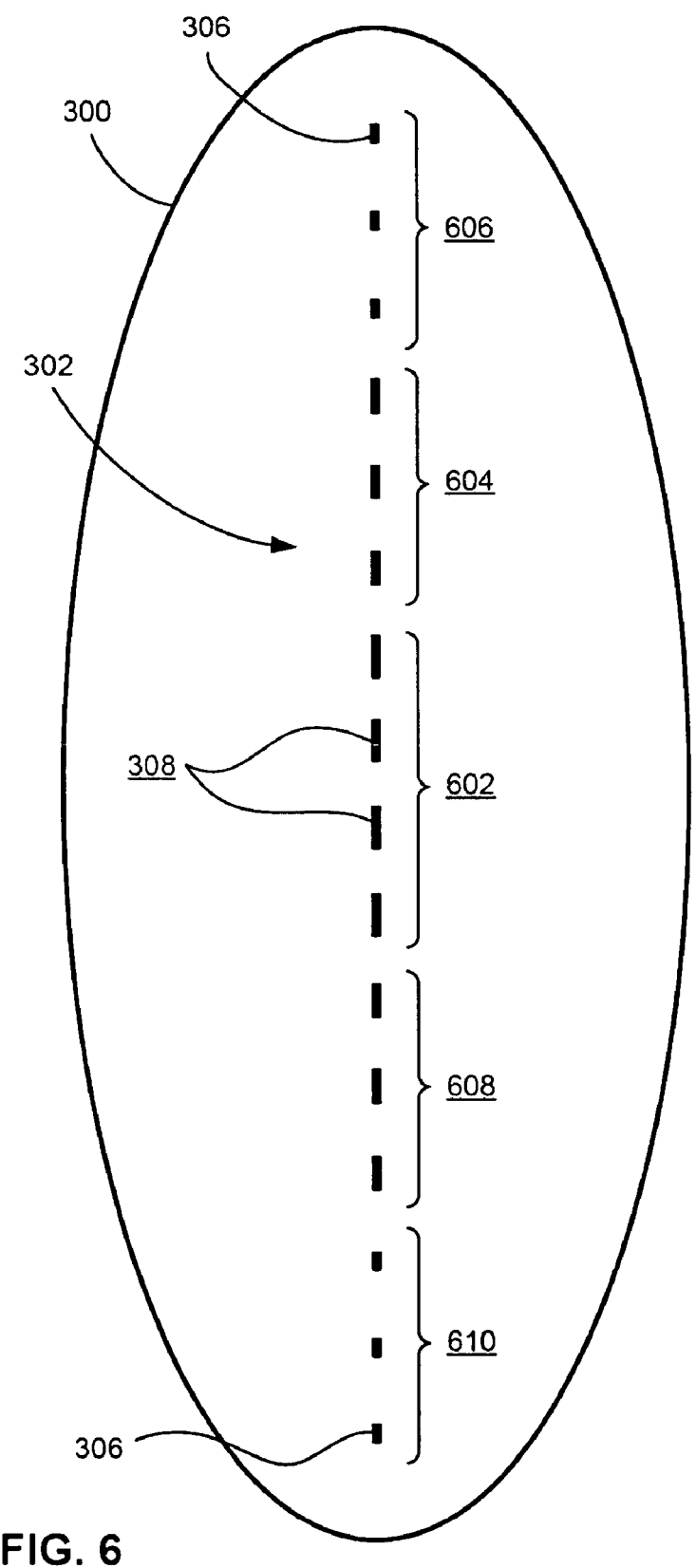
FIG. 6 is a tape bearing surface view of a magnetic tape head having an array of readers according to another embodiment of the present invention.

Yet another embodiment of the present invention, shown in FIG. 6, has adjacent sets 602, 604, 606, 608, 6.10 of readers 302 with reader track widths being about the same in a given set, where the track widths in a given set decrease from the innermost set 602 to the outermost sets 606, 610. Such an embodiment may be selected for processing considerations.

The track widths of the innermost readers 308 are preferably still smaller than the widths of the written data tracks so that tape lateral transients do not create misregistration. Note that some overlap of the readers 302 onto adjacent data tracks is permissible, as in an embodiment having filtering and/or implementing a deconvolution scheme. Thus, some reader track widths may be as large as, or larger than, the written track widths.

Figure 7:
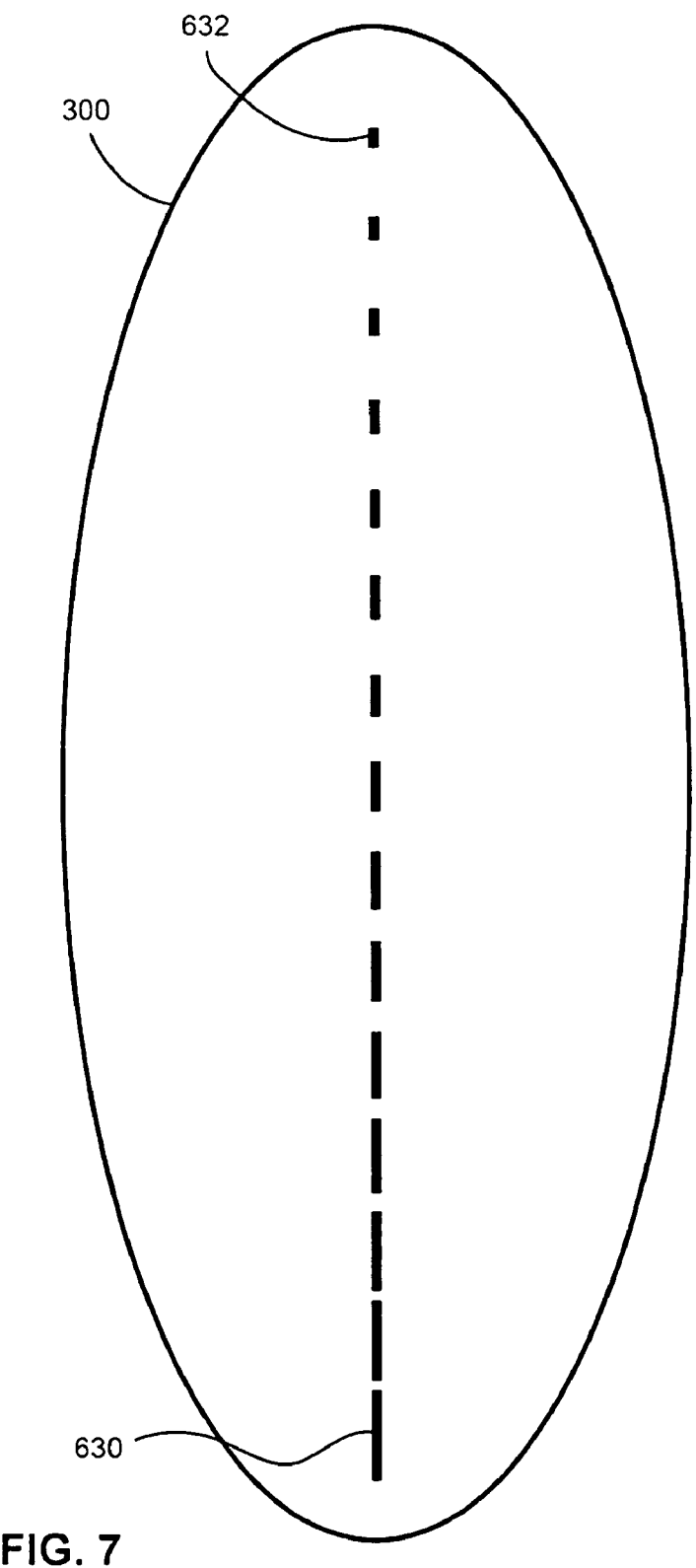
FIG. 7 is a tape bearing surface view of a magnetic tape head having an array of readers according to another embodiment of the present invention.

FIG. 7 illustrates a reader array of a tape head 300 where track widths of the readers 302 progressively decrease from a reader 630 positioned towards a first end of the array to another reader 632 positioned towards a second end of the array. The readers having the widest and narrowest track widths may be the outermost readers, or one or more of them may be positioned between the outermost readers of the array.

Figure 8:
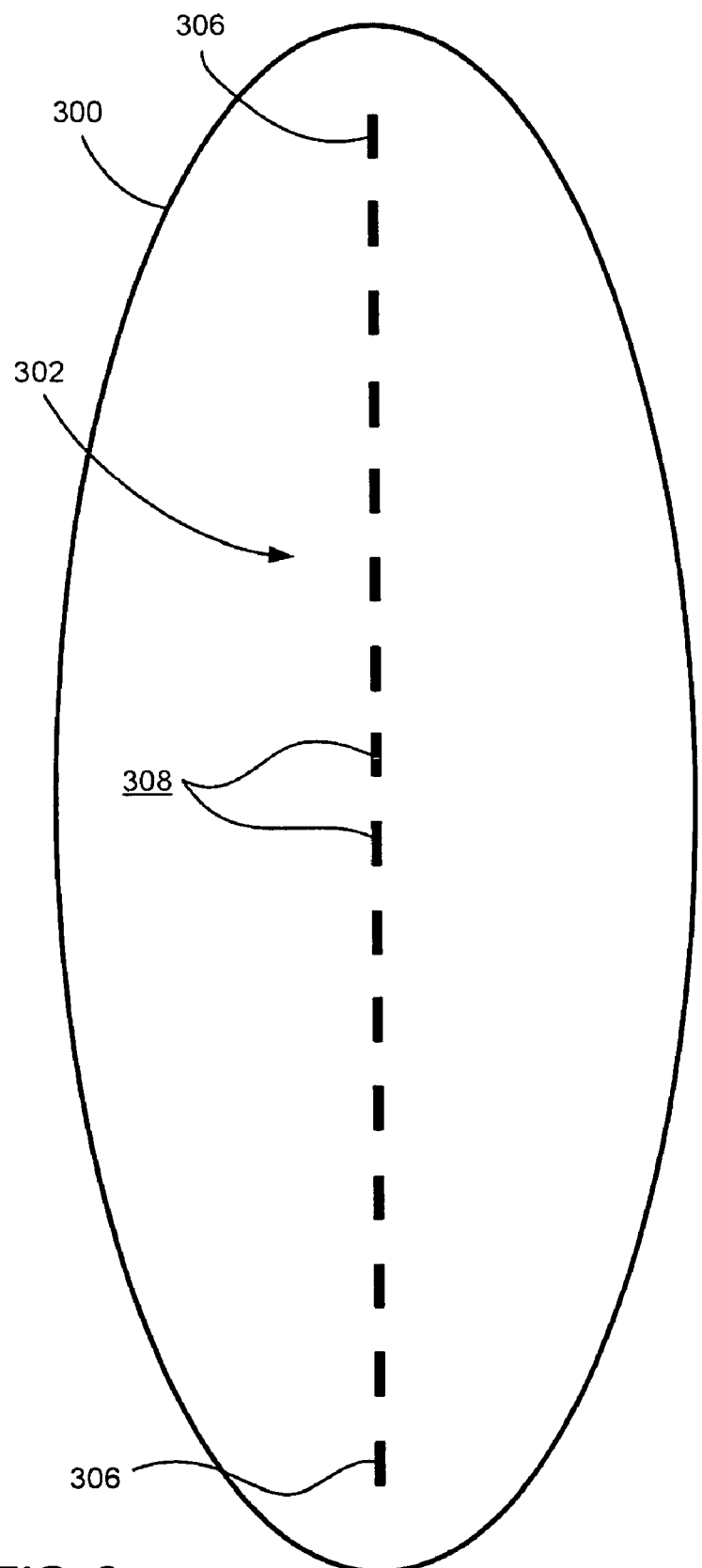
FIG. 8 is a tape bearing surface view of a magnetic tape head having an array of readers according to another embodiment of the present invention.

FIG. 8 illustrates a reader array of a tape head 300 where track widths of some or all of the readers 302 in the array are about the same.

In the heads described above, writers may also be present in a piggyback configuration, an interleaved configuration, etc. Any writers present can be standard writers, and may all have about the same track width.

Figure 9:
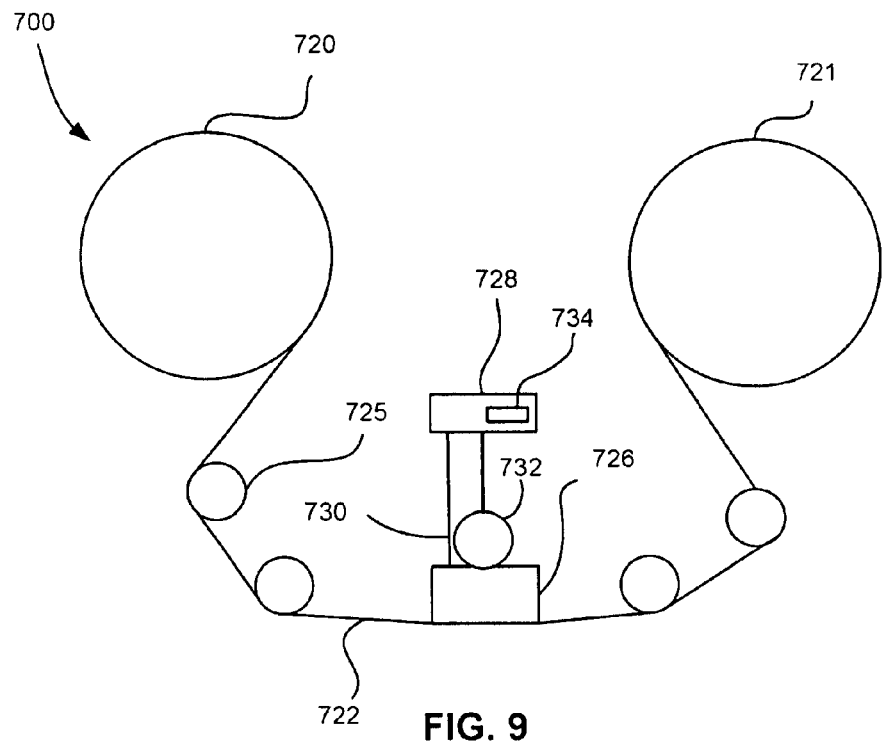
FIG. 9 is a schematic diagram of a tape drive system.

FIG. 9 illustrates a simplified tape drive which may be employed in the context of the present invention. While one specific implementation of a tape drive is shown in FIG. 7, it should be noted that the embodiments of the previous figures may be implemented in the context of any type of tape drive system.

As shown, a tape supply cartridge 720 and a take-up reel 721 are provided to support a tape 722. These may form part of a removable cassette and are not necessarily part of the system. Guides 725 guide the tape 722 across a preferably bidirectional tape head 726, of the type disclosed herein. Such tape head 726 is in turn coupled to a controller 728, e.g., processor via a write-read cable 730. The controller 728, in turn, controls or performs one or more functions such as servo following, writing, reading, error correction, etc. An actuator 732 controls position of the head 726 relative to the tape 722. The controller 728 may include a processor 734 such as an ASIC, microprocessor, CPU, etc. for performing any of the functions described herein.

A tape drive, such as that illustrated in FIG. 9, includes drive motor(s) to drive the tape supply cartridge 720 and the take-up reel 721 to move the tape 722 linearly over the head 726. The tape drive also includes a read/write channel to transmit data to the head 726 to be recorded on the tape 722 and to receive data read by the head 726 from the tape 722. An interface is also provided for communication between the tape drive and a host (integral or external) to send and receive the data and for controlling the operation of the tape drive and communicating the status of the tape drive to the host, all as will be understood by those of skill in the art.

Figure 10:
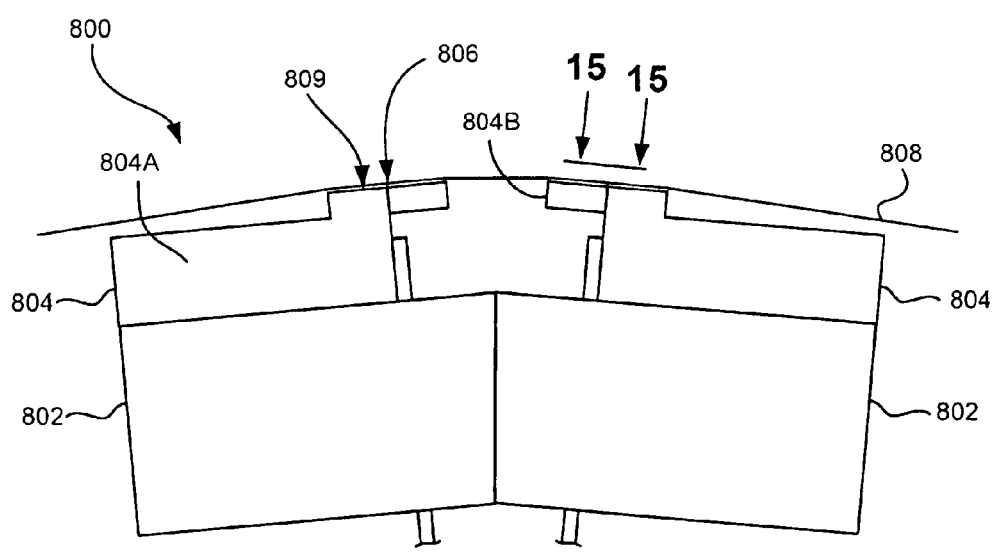
FIG. 10 illustrates a flat-lapped bi-directional, two-module magnetic tape head which may be implemented in the context of the present invention.

FIG. 10 illustrates a flat-lapped bi-directional, two-module magnetic tape head 800 which may be implemented in the context of the present invention. As shown, the head includes a pair of bases 802, each equipped with a module 804. The bases are typically "U-beams" that are adhesively coupled together. Each module 804 includes a substrate 804A and a closure 804B with readers and writers 806 situated therebetween. In use, a tape 808 is moved over the modules 804 along a tape bearing surface 809 in the manner shown for reading and writing data on the tape 808 using the readers and writers 806.

Standard fabrication techniques can be used to create the readers of differing track widths. For example, the physical width of the sensing portion of the sensor itself may define the track width in some embodiments of the present invention. For instance, when defining the active widths of the reader sensors during a photolithography process, mask sizes are adjusted to define the desired reader track widths. In other embodiments of the present invention, the completed or nearly-completed sensor stack can be milled to reduce the physical width of the sensor. In yet other embodiments of the present invention, the ends of the sensor free layers may be pinned via antiparallel coupling with tab overlays, thereby defining the active track width between the pinned portions of the free layer. In further embodiments of the present invention, the ends of the sensor free layers may be pinned via antiferromagnetic coupling with tab overlays, thereby defining the active track width between the pinned portions of the free layer. These embodiments are presented as only a few examples of the many possible ways that the track width can be defined.

While the heads according to various embodiments of the present invention can be implemented alone in any type of tape storage system, various embodiments of the invention use the heads in combination with newly enabled functionality.

Error Control Processing

One embodiment of the present invention includes a method for applying error control processing bandwidth, such as Error Correction Code (ECC) processing bandwidth, Forward Error Correction (FEC) processing bandwidth, or any other type of error control or recovery process or scheme. Processing may be allocated such that the error control processing is adapted to tracks or groups of tracks in an array based on some criteria.

In a given tape data storage system, a certain amount of processing power is allocated to error correction. In one embodiment of the present invention, error correction processing, such as ECC processing, FEC processing, etc., is partitioned such that more of the fixed or dynamic processing bandwidth is applied to processing the signals from some reader or group of readers than another reader or group of readers.

Figure 11:
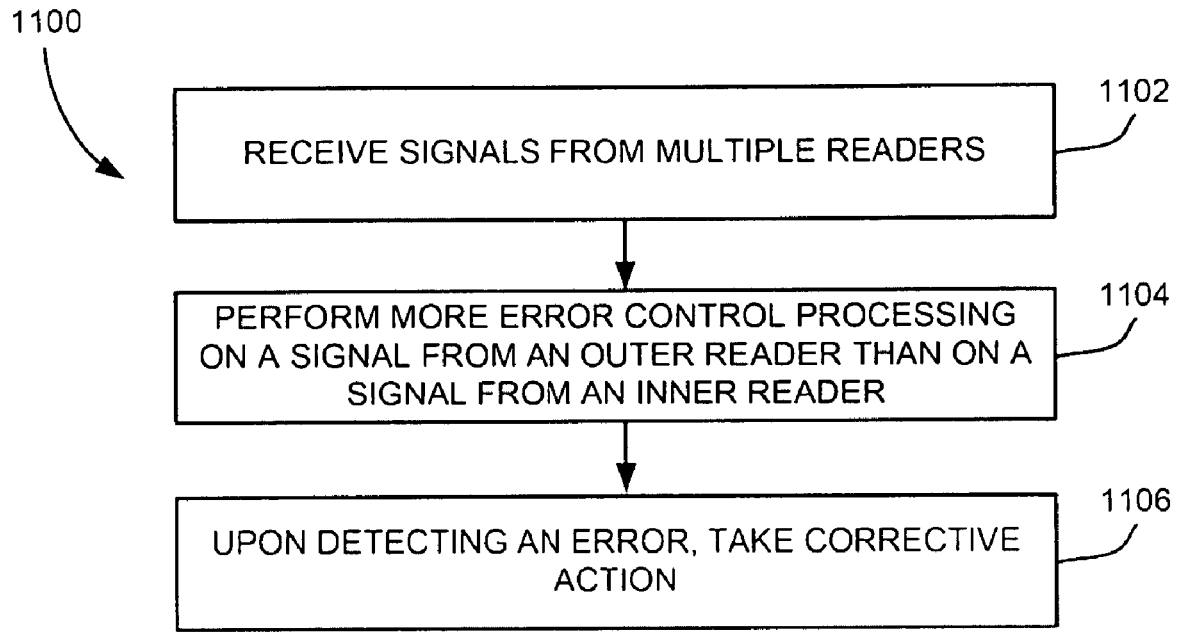
FIG. 11 is a process diagram of a method for error control processing according to one embodiment of the present invention.

Referring to FIG. 11, a method 1100 for error correction processing is presented. As an option, the present method 1100 may be implemented in the context and functionality of FIGS. 1-10. Of course, the method 1100 may be carried out in any desired environment. It should be noted that the aforementioned definitions may apply during the present description.

Referring again to FIG. 11, the method 1100 includes receiving signals from multiple readers in operation 1102, and performing more error control processing on a signal from an outer reader than on a signal from an inner reader in operation 1104. Due to tape lateral expansion, outer readers are typically more susceptible to misregistration than inner readers, particularly where the inner readers are centered over the data tracks. Accordingly, more errors may be expected from the outer channels. In operation 1106, upon detecting an error, corrective action is taken, such as correcting a bit or bits, in the data stream being processed, etc.

Figure 12:
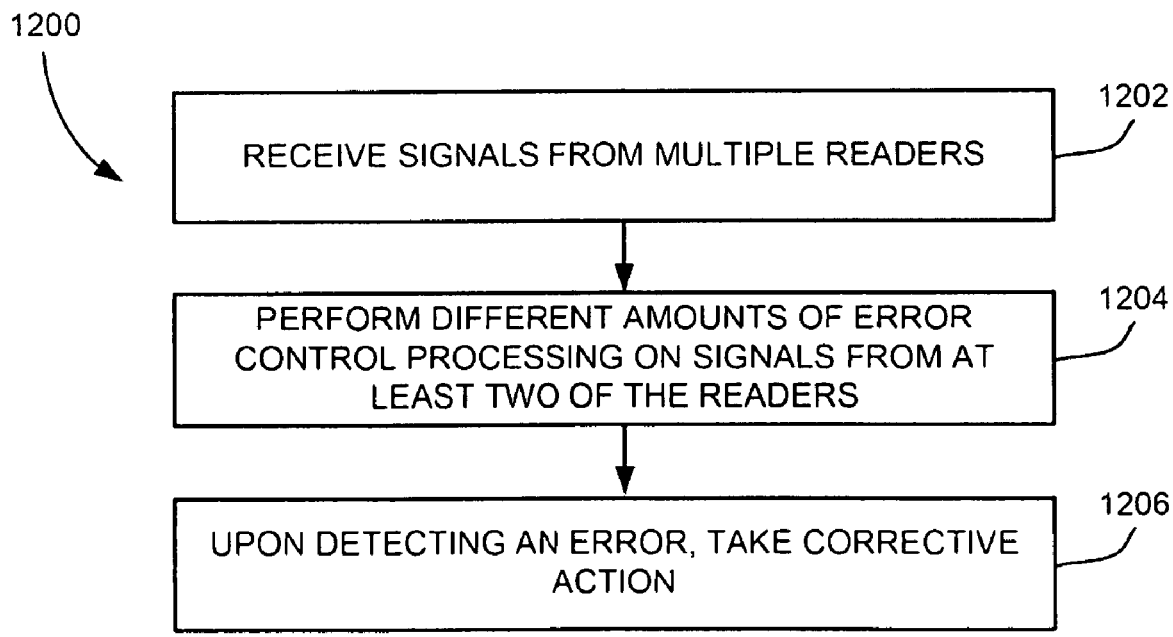
FIG. 12 is a process diagram of a method for error control processing according to one embodiment of the present invention.

Referring to FIG. 12, a method 1200 for error correction processing is presented. As an option, the present method 1200 may be implemented in the context and functionality of FIGS. 1-10. Of course, the method 1200 may be carried out in any desired environment. It should be noted that the aforementioned definitions may apply during the present description.

Referring again to FIG. 12, the method 1200 includes receiving signals from multiple readers in operation 1202, and performing different amounts of error control processing on signals from at least two of the readers in operation 1204. Due to tape lateral expansion, outer readers are typically more susceptible to misregistration than inner readers, particularly where the inner readers are centered over the data tracks. Accordingly, more errors may be expected from the outer channels, such as reading the erase band or encroaching into another track. This is particularly problematic with head layouts such as that shown in FIG. 8. Accordingly, more error correction may be applied to the outer tracks to compensate for such misregistration, when needed.

With continued reference to FIG. 12, in operation 1206, upon detecting an error, corrective action is taken, such as correcting a bit or bits, in the data stream being processed, etc.

Note that the error control processing bandwidth may be allocated in any manner. The error control processing bandwidth can be distributed on a track by track basis, by groups of tracks, etc.

The error correction processing allocation can be based on a sliding scale (progressively increasing from least in the middle to most at the outer), can inversely mimic the decrease in the reader track widths from center towards the outer ends of the array, etc.

In one approach, more error control processing may be performed on signals from a group of outer readers than on signals from a group of inner readers. For example, more processing may be allocated to groups 606 and 610 of FIG. 6 than to the inner groups 602, 604, 608. Moreover, more processing may be allocated to groups 604 and 608 of FIG. 6 than to the inner group 602. In another illustrative approach, pairs or groups of readers having opposite positions in an array of readers may be allocated about a same amount of error control processing bandwidth. For instance the outer readers 306 may be allocated the same amount of error control processing bandwidth.

In an embodiment applied to a system having an array of readers as shown in FIG. 4, for example, more error control processing may be applied to the outermost readers, which have inherently poorer signal to noise ratio due to their smaller width, than to the signals from the wider innermost readers. Particularly, the reduction in reader width, to alleviate misregistration, results in lower signal relative to media noise. Accordingly, more error correction may be applied to the outer tracks than the inner tracks to compensate for the poorer signal to noise ratio.

One illustrative embodiment includes a method for reallocating ECC processing, and is particularly useful in conjunction with heads as shown in FIGS. 4-6 in which the read track widths are adjusted according to their position in the array, e.g., wider at the middle where track misregistration is least, and narrower at the ends where track misregistration due to tape lateral expansion or contraction is most pronounced. One advantage of such embodiments is that they can be implemented using available head and channel technology and does not require complex mechanisms, etc.

In one approach using heads such as those in FIGS. 4-6, read track widths are scaled according to position in the reader array. The widths of the outermost readers, which neighbor servo data readers, are set at what they would be in a conventionally designed head, and so are typically 0.5 or even less times the track pitch on tape. This minimizes misregistration due to mistracking exacerbated by tape width changes, which itself has several causes. The centermost readers accordingly are wider, since these readers can be precisely positioned over the center tape tracks.

The foregoing methodology can be used with standard heads as well as with heads having position-dependent track widths.

Moreover, the foregoing methodology can be used with differing data clock rates, examples of which are presented below. For example, a clock used to recover data from the inner reader has a shorter period than a clock used to recover data from the outer reader.

One advantage of the error correction methodology presented herein is that it can be implemented using available head and channel technology and does not require complex mechanisms, etc.

As noted above, an ECC or FEC code is a code in which each data signal conforms to specific rules of construction so that departures from this construction in the received signal can generally be automatically detected and corrected. It is used in computer data storage, for example in dynamic RAM, and in data transmission. The basic idea is for the transmitter to apply one or more of the above error detecting codes. Then the receiver uses those codes to narrow down exactly where in the message the error (if any) was. If there was a single bit error in transmission, the decoder uses those error detecting codes to narrow down the error to a single bit (1 or 0), then fix that error by flipping that bit. More than one error per message may also be repaired.

One approach uses repetition schemes, such as where if the transmitter repeats each data bit at least 3 different times (triple modular redundancy), the receiver can correct any single-bit error by taking the majority vote of the received data bits.

Another approach uses parity schemes, such as where if the transmitter sends parity bits covering various overlapping groups of the data bits, a single-bit error will cause a parity error in every group that covers that erroneous bit. The receiver can correct any single-bit error by flipping the one bit covered by every group that indicates an error, but not covered by any group that checks out good. There are a wide variety of parity-based codes, differing in exactly how groups of data bits are chosen.

Another approach employs cyclic redundancy checks, such as when a CRC code is added to a message, any single-bit error will cause the received CRC to differ from the receiver-calculated CRC. If the message is short enough, the receiver can figure out exactly which bit was flipped, and correct it.

A further approach uses Hamming distance based checks. Since it takes many bit errors to convert one valid Hamming code word to any other valid Hamming code word, the receiver can correct any single-bit error in a word by finding the "closest" valid Hamming code, the one code word that has only 1 bit different from the received word.

Some codes can correct a certain number of bit errors and only detect further numbers of bit errors. Codes which can correct one error are termed single error correcting (SEC), and those which detect two are termed double error detecting (DED). Hamming codes can correct single-bit errors and detect double-bit errors (SEC-DED). Generally, more sophisticated codes correct and detect even more errors.

An error-correcting code which corrects all errors of up to n bits correctly is also an error-detecting code which can detect at least all errors of up to 2 n bits. Two main categories are convolutional codes and block codes. Examples of the latter are Hamming code, BCH code, Reed-Solomon code, Reed-Muller code, Binary Golay code, and low-density parity-check codes.

Shannon's theorem is an important theorem in error correction which describes the maximum attainable efficiency of an error-correcting scheme versus the levels of noise interference expected. In general, these methods put redundant information into the data stream following certain algebraic or geometric relations so that the decoded stream, if damaged in transmission, can be corrected. The effectiveness of the coding scheme is measured in terms of code rate, which is the code length divided by the useful information, and the Coding gain, which is the difference of the Signal to Noise Ratio (SNR) levels of the uncoded and coded systems required to reach the same Bit Error Rate (BER) levels.

Another approach uses the "Optimal Rectangular Code", used in group code recording tapes, which not only detects but also corrects single-bit errors.

Some file formats, particularly archive formats, include a checksum (most often CRC32) to detect corruption and truncation and can employ redundancy and/or parity files to recover portions of corrupted data.

Embodiments of the present invention may enable allocation of enough of the given ECC computational bandwidth to the outer tracks so as to enable an approximately track-position-independent C1 error rate.

Track-Adapted Data Clocking

In additional embodiments of the present invention, the linear data density of certain data tracks in a given band is increased. In systems where some readers are able to read back data better than others, the linear density in the corresponding data tracks can be increased. This in turn translates to increased tape capacity.

Figure 13:
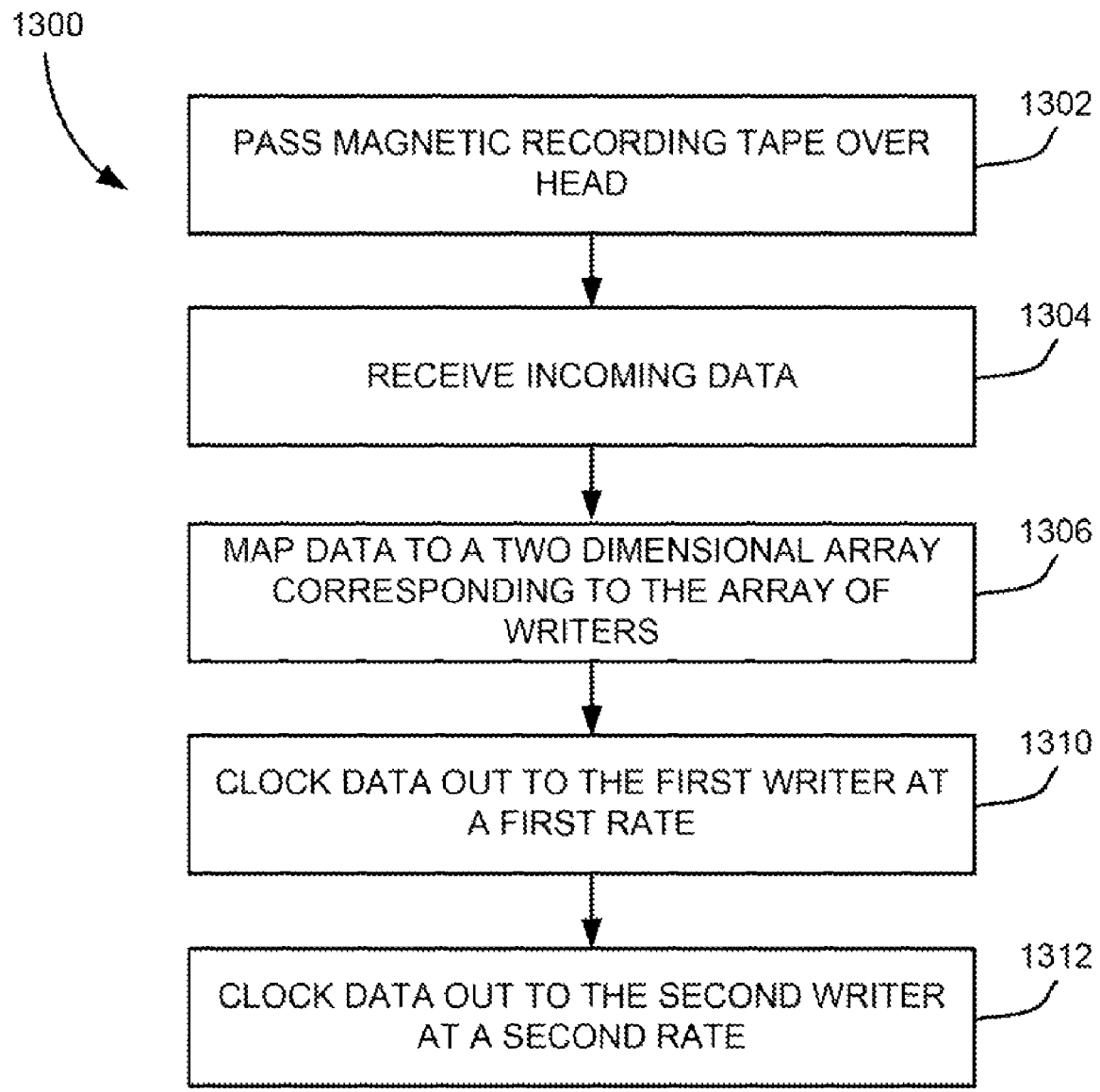
FIG. 13 is a process diagram of a write process according to one embodiment of the present invention.

FIG. 13 illustrates a method 1300 for writing data to a tape at multiple rates for simultaneously creating data tracks having differing linear data densities. As an option, the present method 1300 may be implemented in the context and functionality of FIGS. 1-12. Of course, the method 1300 may be carried out in any desired environment. It should be noted that the aforementioned definitions may apply during the present description.

With continued reference to FIG. 13, in operation 1302, a tape is passed over a head, the head having an array of writers thereon. In operation 1304, incoming data is received, e.g., from a host application, other storage device, etc. The incoming data may be buffered. In operation 1306, the data is mapped to a two dimensional array corresponding to the array of writers. Typically, this entails partitioning the data among the various tracks. In operation 1310, some of the mapped data is clocked to a first writer in the array of writers at a first rate. In operation 1312, some of the mapped data is clocked to a second writer in the array of writers at a second rate different than the first rate.

In one approach, particularly useful in embodiments where a reader is configured as in FIGS. 4-6, the linear data density of the inner data tracks in a given band is increased. Because the inner readers (or groups of readers) may have a wider track width than the outer readers (or groups of readers), the signal obtainable from the middle readers may be greater. Moreover, the middle readers experience less misregistration from tape lateral expansion and contraction. Thus the linear density in the corresponding data tracks can be increased. This in turn translates to increased tape capacity. The inventors estimate that up to about a 30% higher data capacity per cartridge is obtainable.

The data rate for the outermost readers and writers may be what it would have been using a conventional channel. The data rate for the remaining tracks may progressively increase towards the center channels. The data rate may thus be scaled according to reader track width such that in a preferred embodiment the C1 error rate is approximately track independent. Since inner tracks have a higher linear density than outer tracks, heads may be fabricated with transducers having write and/or read gaps tuned to the associated linear density. See, e.g., FIG. 15, described below as having different read and write gaps.

Other types of progressive heads can be used, such as ones having a wider reader at one end of the array and progressively smaller readers towards the other end, e.g., as in the head shown in FIG. 7. Accordingly, the first writer may be positioned towards one end of the array, while the second writer may be positioned towards another end of the array, where the first rate is faster than the second rate.

In this or any other embodiment, each channel (or group of channels) may have its own write and/or read clock, where the clock period of inner readers and/or writers is shorter than the clock period for outer readers and/or writers. The individual clocks can be generated by dividing down a master clock signal, e.g., the system clock.

Figure 14:
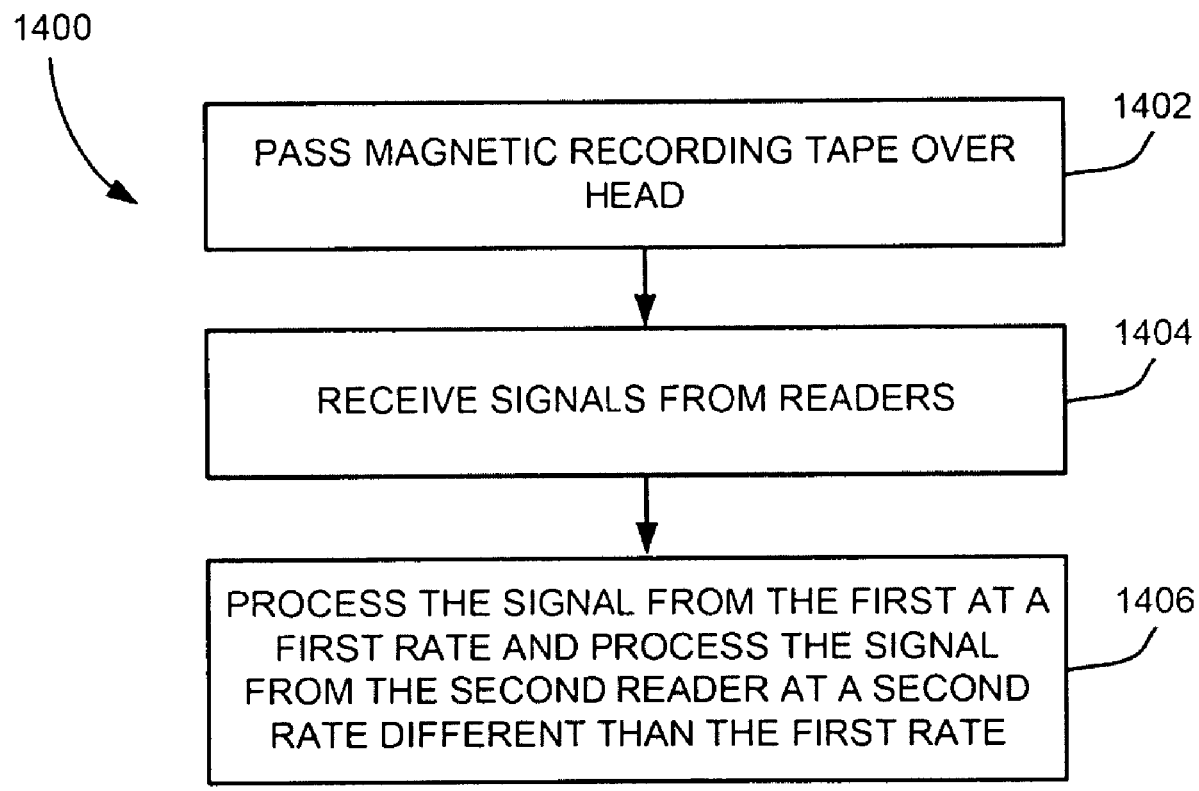
FIG. 14 is a process diagram of a read process according to one embodiment of the present invention.

During readback, the same or equivalent clocks (or clock periods) may be used to reassemble the data being read from the tape. FIG. 14 illustrates a read process 1400 according to one embodiment of the present invention. As an option, the present method 1400 may be implemented in the context and functionality of FIGS. 1-13. Of course, the method 1400 may be carried out in any desired environment. It should be noted that the aforementioned definitions may apply during the present description.

Referring again to FIG. 14, in operation 1402, a magnetic recording tape is passed over a head. Signals are received from the readers in operation 1404. The data may be buffered. In operation 1406, the signal from the first reader is processed at a first rate while the signal from the second reader is processed at a second rate different than the first rate.

When the method is performed in conjunction with heads as in FIGS. 4-6, signals are received from the readers and the signals are processed at progressively faster rates from the outer to the inner data tracks, the rates corresponding to the increasing linear data density of the data tracks.

For example, specifications of the outermost readers, which neighbor servo readers, may be set to what they would be in a conventionally designed head. Thus, for example, reader widths for the outermost tracks is typically 0.5 times the track pitch on tape. This minimizes misregistration due in part to tape width changes, which itself has several causes. In this example, the centermost readers are wider, since these readers can be precisely positioned over the center tape tracks. The wider readers are capable of reading data at a faster clock rate than the narrower outer readers. Accordingly, the reader gaps for the center readers may be decreased to improve signal readback resolution for the higher data rate.

Figure 15:
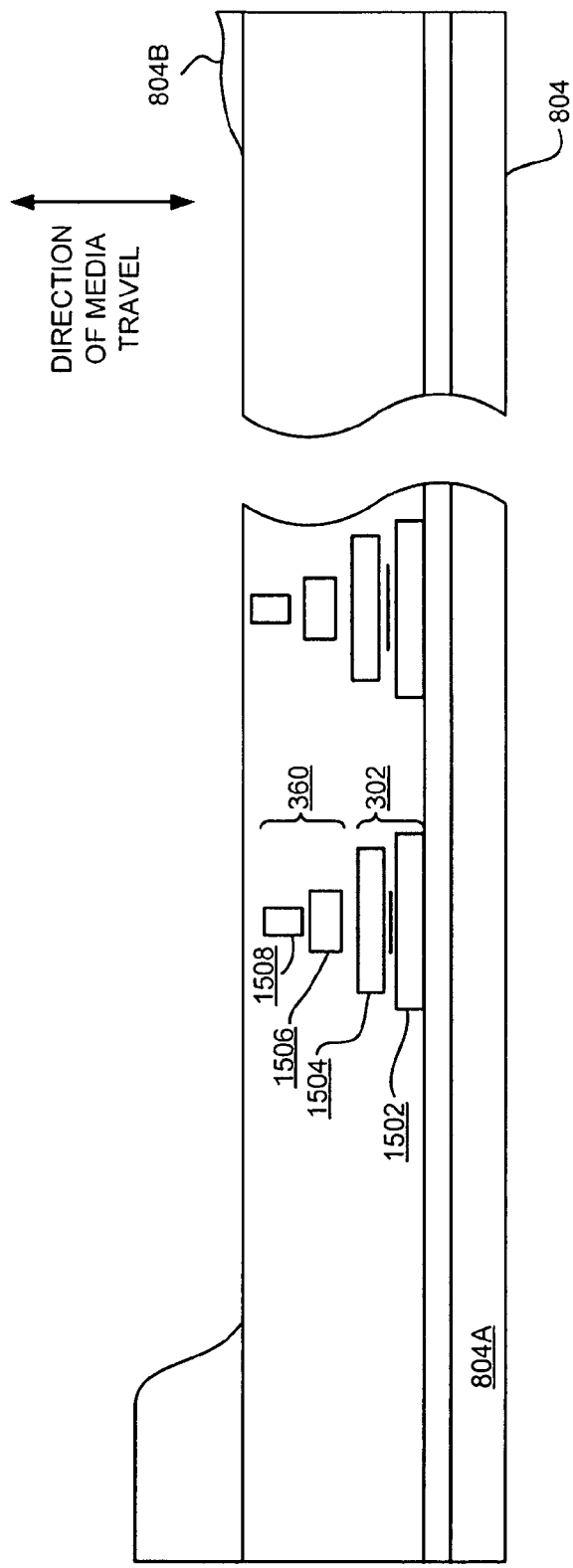
FIG. 15 is a partial detailed view taken from Line 11 of FIG. 8 showing an array of readers and writers in a piggyback configuration according to one embodiment of the present invention.

The data rate for the outermost readers and writers can be what it would have been using a conventional channel. The data rate for the remaining tracks may progressively increase towards the center tracks. The data rate may thus be scaled according to reader track width such that in a preferred embodiment the C1 error rate is approximately track independent. Since inner tracks will have a higher linear density than outer tracks, heads may be fabricated with transducers having write and read gaps tuned to the associated linear density. In one approach, heads may have read track widths and/or read gaps scaled according to position in the reader array. In another approach, the reader gaps for the center readers may be decreased to improve signal readback resolution for the higher data rate. FIG. 15 illustrates readers 302 and writers 360 having differing read and write gaps. The read gap is generally defined between shields 1502, 1504 of the reader 302, while the write gap is generally defined between the pole tips 1506, 1508 of the writer 360.

Alternately, it should be noted that a progressive head architecture can be used with the same linear density on all channels, but the inner channels may be preferentially weighted in multi-track clock recovery schemes such as global clocking to improve overall clock recovery quality on all channels One advantage of embodiments of the present invention is that they can be implemented readily fabricated heads and does not require complex mechanisms, etc.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system for writing data to a tape at multiple rates for simultaneously creating data tracks having differing linear data densities, the system comprising:
    a head having an array of writers thereon;
    a drive mechanism for passing a tape over the head;
    a controller and/or circuitry for:
        receiving incoming data;
        mapping the data to a two dimensional array corresponding to the array of writers;
        clocking some of the mapped data to a first writer in the array of writers at a first rate, the first writer writing the data clocked thereto at the first rate to a first data track in a data band defined between servo tracks on the tape; and
        clocking some of the mapped data to a second writer in the array of writers at a second rate different than the first rate, the second writer writing the data clocked thereto at the second rate to a second data track in the data band.

2. The system as recited in claim 1, wherein the first writer is positioned towards a middle of the array of writers, wherein the second writer is positioned towards an end of the array of writers relative to the first writer, wherein the first rate is faster than the second rate.

3. The system as recited in claim 1, wherein the first writer is positioned towards one end of the array of writers, wherein the second writer is positioned towards another end of the array of writers, wherein the first rate is faster than the second rate.

4. The system as recited in claim 1, wherein a write gap of the first writer is different than a write gap of the second writer.

5. The system as recited in claim 1, wherein the first writer is part of a first group of writers to which the data is clocked at the first rate.

6. The system as recited in claim 5, wherein the second writer is part of a second group of writers to which the data is clocked at the second rate.

7. The system as recited in claim 1, wherein the controller clocks some of the mapped data to a third writer in the array of writers at a third rate different than the first and second rates.

8. A system for reading data from data tracks having differing linear data densities, the system comprising:
    a head having an array of readers thereon;
    a drive mechanism for passing a tape over the head;
    a controller and/or circuitry for:
        analyzing servo readback signals;
        positioning the head relative to the tape so that the readers are over particular data tracks on the tape,
        receiving signals from the readers generated as the data tracks on the tape pass by the readers;
        processing the signal from a first reader in the array of readers at a first rate; and
        processing the signal from a second reader in the array of readers at a second rate different than the first rate.

9. The system as recited in claim 8, wherein a track width of the first reader of the array is greater than a track width of the second reader, wherein the first rate is faster than the second rate.

10. The system as recited in claim 8, wherein the first reader is positioned towards one end of the array, wherein the second reader is positioned towards another end of the array, wherein the first rate is faster than the second rate.

11. The system as recited in claim 8, wherein a read gap of the first reader is different than a read gap of the second reader.

12. The system as recited in claim 8, wherein the first reader is part of a first group of readers, the signals from which are processed at the first rate.

13. The system as recited in claim 12, wherein the second reader is part of a second group of readers, the signals from which are processed at the second rate.

14. The system as recited in claim 8, further comprising processing the signal from a third reader in the array of readers at a third rate different than the first and second rates.

15. A method for writing data to a tape at multiple rates for simultaneously creating data tracks having differing linear data densities, the method comprising:

passing a tape over a head, the head having an array of writers thereon;

receiving incoming data;

mapping the data to a two dimensional array corresponding to the array of writers;

clocking some of the mapped data to a first writer in the array of writers at a first rate, the first writer writing the data clocked thereto at the first rate to a first data track in a data band defined between servo tracks on the tape; and clocking some of the mapped data to a second writer in the array of writers at a second rate different than the first rate, the second writer writing the data clocked thereto at the second rate to a second data track in the data band.

16. The method as recited in claim 15, further comprising clocking some of the mapped data to a third writer in the array of writers at a third rate different than the first and second rates.

17. A method for reading data from data tracks having differing linear data densities, the method comprising:

passing a tape over a head, the head having an array of readers thereon;

receiving servo signals from the readers;

receiving data signals from the readers;

processing the data signal from a first reader in the array of readers at a first rate; and processing the data signal from a second reader in the array of readers at a second rate different than the first rate.

18. The method as recited in claim 17, further comprising processing a signal from a third reader in the array of readers at a third rate different than the first and second rates.

19. The method as recited in claim 17, wherein a read gap of the first reader is different than a read gap of the second reader.

20. The method as recited in claim 17, wherein a track width of the first reader of the array is greater than a track width of the second reader.

* * * * *